United States Patent [19]
Uno et al.

[11] Patent Number: 5,748,276
[45] Date of Patent: May 5, 1998

[54] LIQUID CRYSTAL DISPLAY UNIT WITH A PLURALITY OF SUBPIXELS

[75] Inventors: Mitsuhiro Uno, Neyagawa; Yoneharu Takubo, Toyonaka; Katsuhiko Kumagawa; Satoshi Asada, both of Neyagawa; Naomi Takada, Kyoto, all of Japan

[73] Assignee: Matsushita Electric Industrial Co., Ltd., Osaka, Japan

[21] Appl. No.: 762,419

[22] Filed: Dec. 9, 1996

Related U.S. Application Data

[62] Division of Ser. No. 450,622, May 25, 1995, Pat. No. 5,610,739.

[30] Foreign Application Priority Data

| May 31, 1994 | [JP] | Japan | 6-118828 |
| Dec. 2, 1994 | [JP] | Japan | 6-299595 |
| Dec. 22, 1994 | [JP] | Japan | 6-320277 |
| Jan. 30, 1995 | [JP] | Japan | 7-012138 |

[51] Int. Cl.$^6$ ............... G02F 1/1343; G09G 3/36
[52] U.S. Cl. ............... 349/144; 349/38; 349/85; 345/92
[58] Field of Search ............... 349/85, 110, 144, 349/143, 42, 43, 38; 345/87, 89, 92, 152, 147

[56] References Cited

U.S. PATENT DOCUMENTS

| 4,840,460 | 6/1989 | Bernot et al. | 350/333 |
| 5,126,865 | 6/1992 | Sarma | 359/59 |
| 5,151,803 | 9/1992 | Wakita et al. | 349/173 |
| 5,191,452 | 3/1993 | Sarma | 359/59 |
| 5,245,450 | 9/1993 | Ukai et al. | 359/55 |
| 5,319,480 | 6/1994 | McCartney | 359/59 |
| 5,321,535 | 6/1994 | Ukai et al. | 359/55 |
| 5,434,690 | 7/1995 | Hisatake et al. | 349/8 |
| 5,574,582 | 11/1996 | Takada et al. | 349/110 |
| 5,576,863 | 11/1996 | Aoki et al. | 349/117 |

FOREIGN PATENT DOCUMENTS

| 0357463 | 3/1990 | European Pat. Off. |
| 0562120 | 9/1993 | European Pat. Off. |
| 5-289108 | 11/1993 | Japan |

OTHER PUBLICATIONS

"Thin Film Transistor for Gray Scale LCD," IBM Technical Disclosure Bulletin, vol. 33, No. 1A, Jun. 1, 1990.

Sunata et al., "A Wide–Viewing–Angle 10–Inch–Diagonal Full–Color Active–Matrix LCD Using a Halftone–Gray-scale Method," Proceedings of the International Display Research Conference, No. CONF. 11, Oct. 15, 1991 Institute of Electrical and Electronics Engineers, XP000571463, pp. 255–257.

*Primary Examiner*—William L. Sikes
*Assistant Examiner*—Tai V. Duong
*Attorney, Agent, or Firm*—Morrison & Foerster LLP

[57] ABSTRACT

A liquid crystal display unit including a plurality of subpixels in each pixel provides superior gradation over a wide viewing angle, and is produced with no increase in manufacturing cost and no deterioration of desired properties (such as reduction in brightness, contrast and response). No additional manufacturing step is required since a control capacitor electrode is formed at the same time as source and drain electrodes constituting a thin-film transistor. By controlling the ratio of display area and the difference in applied voltage of the subpixels, preferable viewing angle properties are obtained. The display properties at the boundary of subpixels are improved by controlling the gap width and the direction of boundary of the subpixels, thus providing a bright display.

6 Claims, 15 Drawing Sheets

5,748,276

LIQUID CRYSTAL DISPLAY UNIT WITH A PLURALITY OF SUBPIXELS

This application is a divisional of U.S. application Ser. No. 08/450,622 filed May 25, 1995 now U.S. Pat. No. 5,610,739.

FIELD OF THE INVENTION

This invention relates to a liquid crystal display unit in which each pixel is subdivided into a plurality of subpixels, and voltage applied to a liquid crystal layer of each subpixel is different from that of other subpixels, thus achieving a preferable gradation display over a wide viewing angle.

BACKGROUND OF THE INVENTION

A conventional example of a liquid crystal display unit in which each pixel includes subpixels is disclosed in U.S. Pat. No. 4,840,460 (first conventional example). FIG. 11(a) shows an equivalent circuit of the example. In the figure, 101 and 102 are gate wirings; 103 and 104 are source wirings; 105 is a thin-film transistor (TFT); and 106 is a common electrode. A pixel at the intersection of gate wiring 101 and source wiring 103 is indicated in the equivalent circuit. One pixel is divided into three subpixels. Control capacitors $C_{c1}$, $C_{c2}$ and $C_{c3}$ are coupled in series with effective capacitors $C_{Lc1}$, $C_{Lc2}$ and $C_{Lc3}$ respectively. Voltage applied to a liquid crystal layer of each subpixel element is determined by the ratio between the capacitance of effective capacitor $C_{LCi}$ and that of control capacitor Ci (where i=1, 2 and 3), when selection signals are provided to gate wiring 101 to turn on TFT 105 and voltage V is provided from source terminal 103. In other words, since this liquid crystal display unit includes subpixels with different operating voltage levels and displays by controlling the capacitance of the control capacitors of the subpixels, viewing angle properties are improved.

In the above-mentioned U.S. patent document, a specific structure for a subpixel using a divided subpixel electrode and control capacitor electrode is disclosed. FIG. 11(b) is a cross-sectional view of the subpixel element in which a subpixel electrode 113 is divided into three sections and a control capacitor is formed by sandwiching an insulating film 114 between the subpixel electrode and a control capacitor electrode 115. The capacitance of the control capacitor is controlled at a preferable level by varying the area of control capacitor electrode 115 at each subpixel. The control capacitor electrode is coupled to the drain electrode of TFT by a terminal 116. Referring to the figure, 112 indicates a liquid crystal layer, forming an effective capacitor between each section of subpixel electrode 113 and a common electrode 111. The U.S. patent document also discloses a subpixel element in which a pixel electrode is not divided and an insulating film, having a thickness and a dielectric constant associated with one subpixel different from those associated with other subpixels, is formed between the pixel electrode and a liquid crystal layer so as to act as a control capacitor. However, in this structure, the area of the control capacitor is controlled by the area of the subpixel, so that it is realistically difficult to set the capacitance of the control capacitor at a preferable level. Since the structure shown in FIG. 11(b) can be designed more freely than the structure having an undivided pixel electrode, the former is more preferable than the latter.

However, several problems regarding the structure shown in FIG. 11(b) have been found. First, in order to achieve this structure, control capacitor electrode 115 and insulating film 114 have to be additionally formed, thus increasing manufacturing cost. In addition, by utilizing white and black gradations that are independent of viewing angle, a plurality of subpixels of one pixel is activated at these gradations, and a gradation display (gray scale display) that is independent of viewing angle is provided by the number of subpixels displaying white or black gradations, so that the number of subpixels has to be increased with the addition of gradation to a display. As a result, the driving voltage increases. The third problem of the liquid crystal unit having a subdivided pixel electrode in each subpixel element is that sections formed with no electrodes—such as gaps between subpixels—increase, thus reducing the pixel display area and lowering the brightness of a display screen, lowering constrast due to the leakage of light from the gaps between the subpixels, and slowing the speed of response because of deformed liquid crystal molecular orientation caused by an electric field, spread in a horizontal direction at the edges of subpixel electrodes.

In order to solve the above-noted third problems, U.S. Pat. No. 5,245,450 discloses a liquid crystal display unit shown in FIG. 12 (second conventional example). A control capacitor electrode 126 below an insulating film 125 and on a bottom substrate 127 in the figure is made of a transparent conductive film, and is also formed at gaps between four subpixels 124. A common electrode 122 is formed on the interior surface of a top substrate 121, and a liquid crystal layer 123 is sandwiched between two substrates. The problem mentioned above is solved by activating liquid crystal layer 123 with voltage applied between control capacitor electrode 126 and common electrode 122. However, compared with other conventional TFT liquid crystal display units, the unit is produced at a low rate since the transparent conductive film and insulating film 125 have to be additionally formed.

Furthermore, a display unit disclosed in Published Unexamined (Laid-Open) Japanese Patent Application No. Hei 5-289108 (third conventional example) also solves the above-described third problem. According to the plan view shown in FIG. 13, the gap between subpixel electrodes 133 and 134 and the peripheral section of subpixels are covered with a control capacitor electrode 135, a shielding electrode made of chrome or the like. In the figure, 131 is a gate wiring, and 132 is a source wiring. In this conventional example, control capacitor electrode 135 can be formed at the same time when a chrome film is formed as a shielding section 136 for a TFT section, so that the manufacturing processes are simple. Contrast is also at a preferable level since light does not leak from the gap between subpixel electrodes 133 and 134. However, the brightness of the display decreases due to the complete shielding of light at the gap between subpixel electrodes 133 and 134.

SUMMARY OF THE INVENTION

It is an object of the present invention to provide an improved liquid crystal display unit by a conventional manufacturing method that has superior gradation properties over a wide viewing angle, thus preventing an increase in manufacturing cost.

In order to accomplish this object, the liquid crystal display unit of the present invention includes a thin-film transistor of a reverse staggered structure, a plurality of subpixels in each pixel, and a control capacitor coupled in series with a liquid crystal capacitor at one or more subpixels. The control capacitor consists of a conducting pattern, which is formed at the same time as a source and a drain electrodes constituting the thin-film transistor, and subpixel electrodes.

It is a feature of the present invention to provide a liquid crystal display unit having at least two subpixels, so that superior multiple gradation display with low voltage is achieved in a main viewing angle.

In order to accomplish this object, the liquid crystal display unit includes liquid crystal sandwiched between two substrates, pixels arranged on the substrate in a matrix, at least two subpixels constituting each pixel, and a means to apply different voltages to a liquid crystal layer of each subpixel. The ratio of display area between the subpixels and the difference in driving voltage of the subpixels are controlled so as to provide a smooth curve describing or increasing a correlation between brightness and voltage of one pixel at an angle of 0°–40° inclined from an axis perpendicular to the substrates along the long axis of liquid crystal molecules positioned in the middle layer of the liquid crystal.

It is yet another feature of the present invention to provide a bright liquid crystal display unit that does not shield gaps between pixels, but rather improves display properties by preventing the decrease in contrast caused by the leakage of light from subpixel gaps and the decline in speed of response due to the transitional disarray of liquid crystal orientation.

In order to accomplish this object, $0° \leq \phi \leq 45°$ when $\phi$ is an angle where the boundary of the subpixels intersects with the long axis of liquid crystal molecules in the middle of a liquid crystal layer that is determined by the directions of rubbing treatments on the top and bottom substrates. The gap between the subpixels is two times as thick or less than the liquid crystal layer.

DETAILED DESCRIPTION OF THE INVENTION

Figure 1:
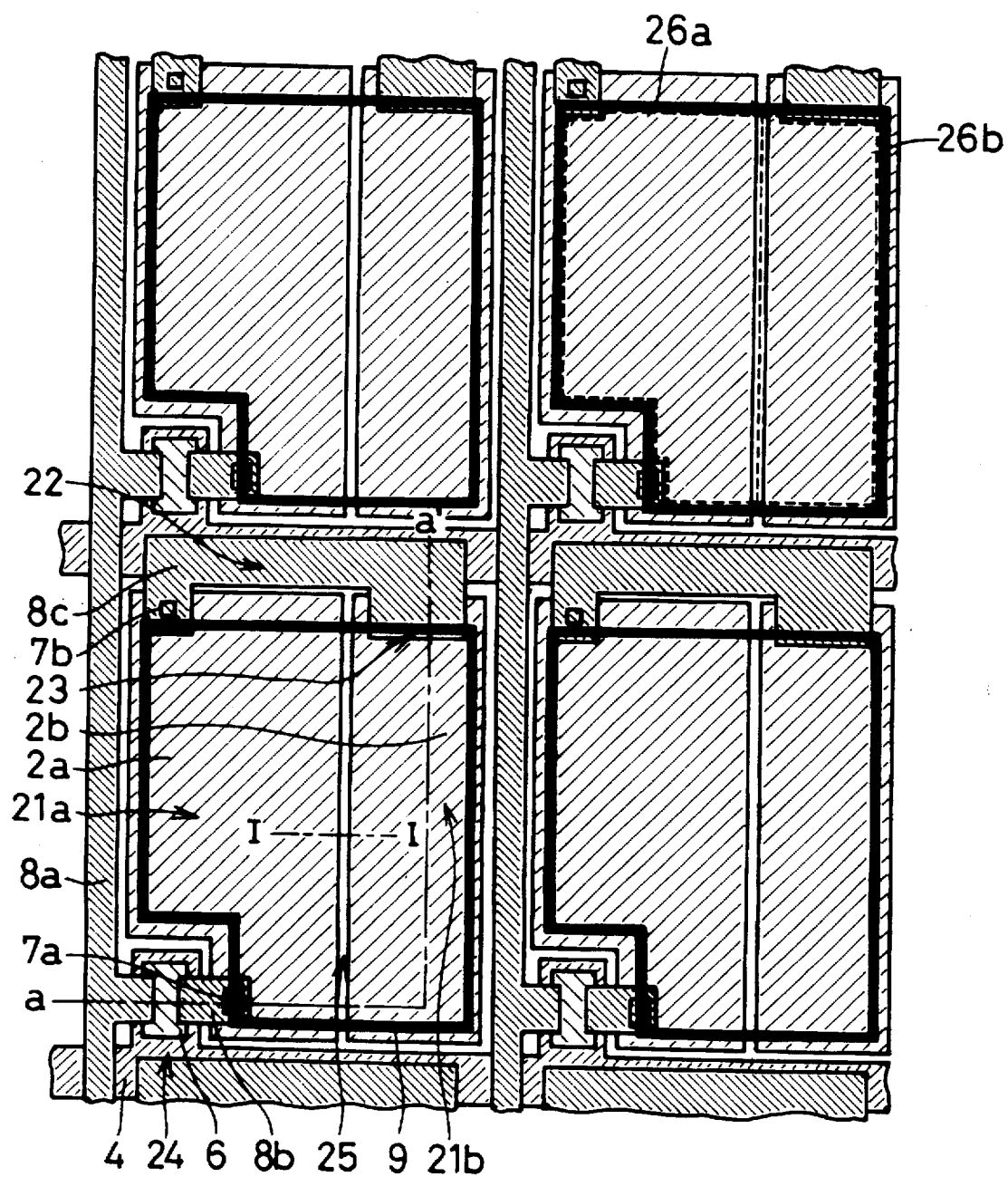
FIG. 1(a) is a plan view of a liquid crystal display unit having a thin-film transistor (TFT) of a first embodiment of the present invention.
FIG. 1(b) is a cross-sectional view of the liquid crystal display unit of the first embodiment of the present invention.
FIG. 1(c) is an equivalent circuit diagram of the liquid crystal display unit of the first embodiment of the present invention.
Figure 1:
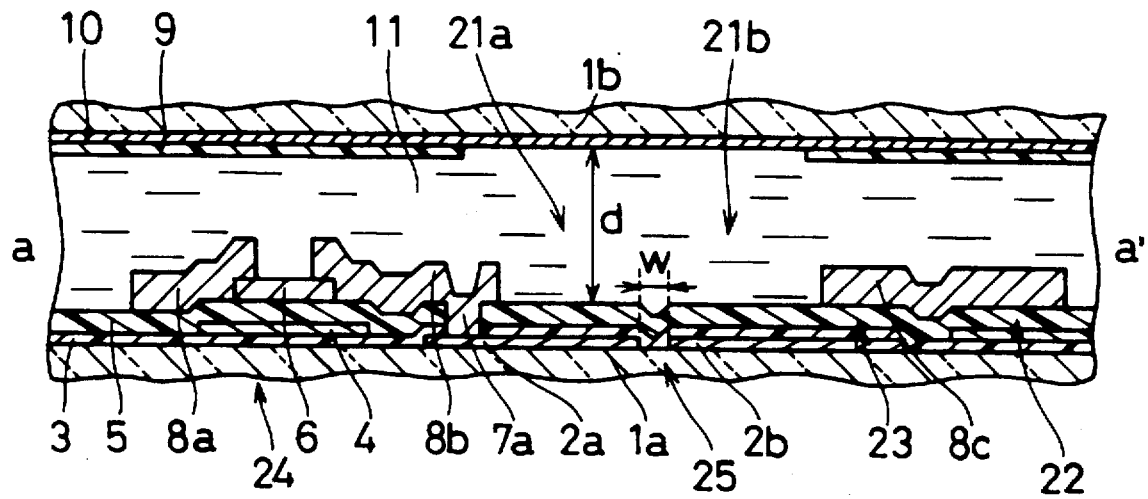
Figure 1:
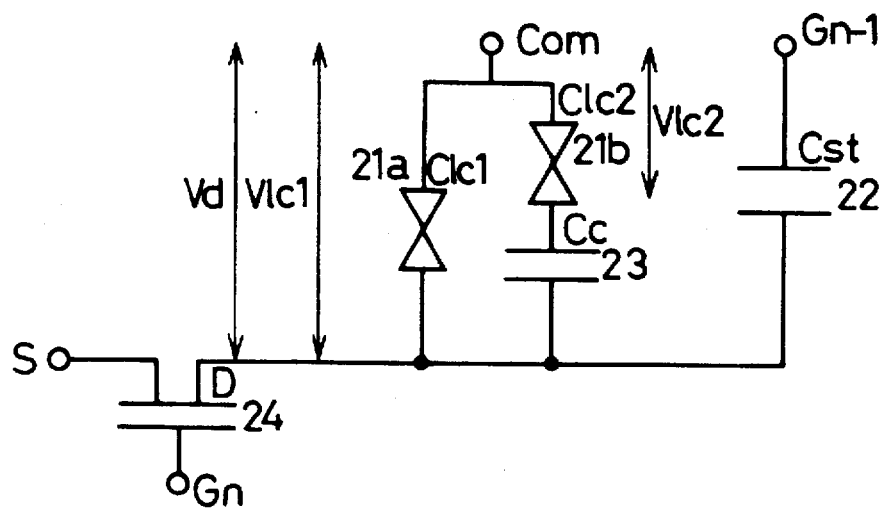

The present invention will be described by referring to the following illustrative examples and attached figures.

EXAMPLE 1

FIG. 1(a) is a plan view of a TFT liquid crystal display unit of the present invention. FIG. 1(b) is a cross-sectional view taken on line a–a' of FIG. 1(a). FIG. 1(c) is an equivalent circuit diagram of one pixel of the liquid crystal display unit. The method of manufacturing a TFT array substrate includes the following steps. Forming transparent electrodes 2a and 2b on a transparent glass substrate 1a for driving the liquid crystal of subpixels 21a and 21b. Forming a silicon oxide film 3 on the substrate and the electrodes as an insulating film. Forming a TFT gate electrode 4 made of metal such as chrome. Laminating a silicon nitride film 5 on the gate electrode as a TFT gate insulating film. Forming a semiconductor layer 6 comprising TFT on the gate insulating film. Making holes 7a and 7b in silicon oxide film 3 and silicon nitride film 5, thus exposing a section of transparent electrode 2a. Forming a source electrode 8a, a drain electrode 8b, and a control capacitor electrode 8c at the same time by using aluminum/titanium two-layer metal, thus coupling drain electrode 8b to transparent electrode 2a through hole 7a and control capacitor electrode 8c to transparent electrode 2a through hole 7b. Forming a control capacitor 23 between control capacitor electrode 8c and transparent electrode 2b. And, forming an additional capacitor 22 between the gate electrode and control capacitor electrode 8c.

The resistance of the semiconductor layer changes due to voltage applied to gate electrode 4, and the layer has properties of a switch element. 24 is a thin-film transistor (TFT). The TFT array substrate and another substrate 1b formed with black matrices 9 and a transparent electrode 10 are coated with alignment films and are provided with a rubbing treatment or the like. Then, these two substrates are combined with an about 5 μm gap in-between, and liquid crystal 11 is injected in the gap. Furthermore, two polarization plates are arranged on the exterior surfaces of the two substrates so as to set the polarization axis of one plate at right angles to that of another plate. As a result, the liquid crystal display unit of the first embodiment is manufactured. Referring to FIG. 1(c), driving voltage (Vd) from the TFT is supplied to the liquid crystal layer, and voltage applied to subpixel 21a is Vlc1. Control capacitor 22 (Cc) is coupled in series with the liquid crystal capacitor of subpixel 21b between the TFT drain electrodes and the transparent electrode. The driving voltage (Vd) supplied from the TFT is applied to control capacitor 22 and the liquid crystal capacitor (Clc2), and the voltage applied to the liquid crystal of subpixel 21b is lower than that applied to the liquid crystal of subpixel 21a, as shown in the following formula:

$$Vlc1=Vd,$$

$$Vlc2=Vd\times(Cc/(Clc2+Cc)),$$

thus $$Vlc2<Vlc1.$$

Figure 10:
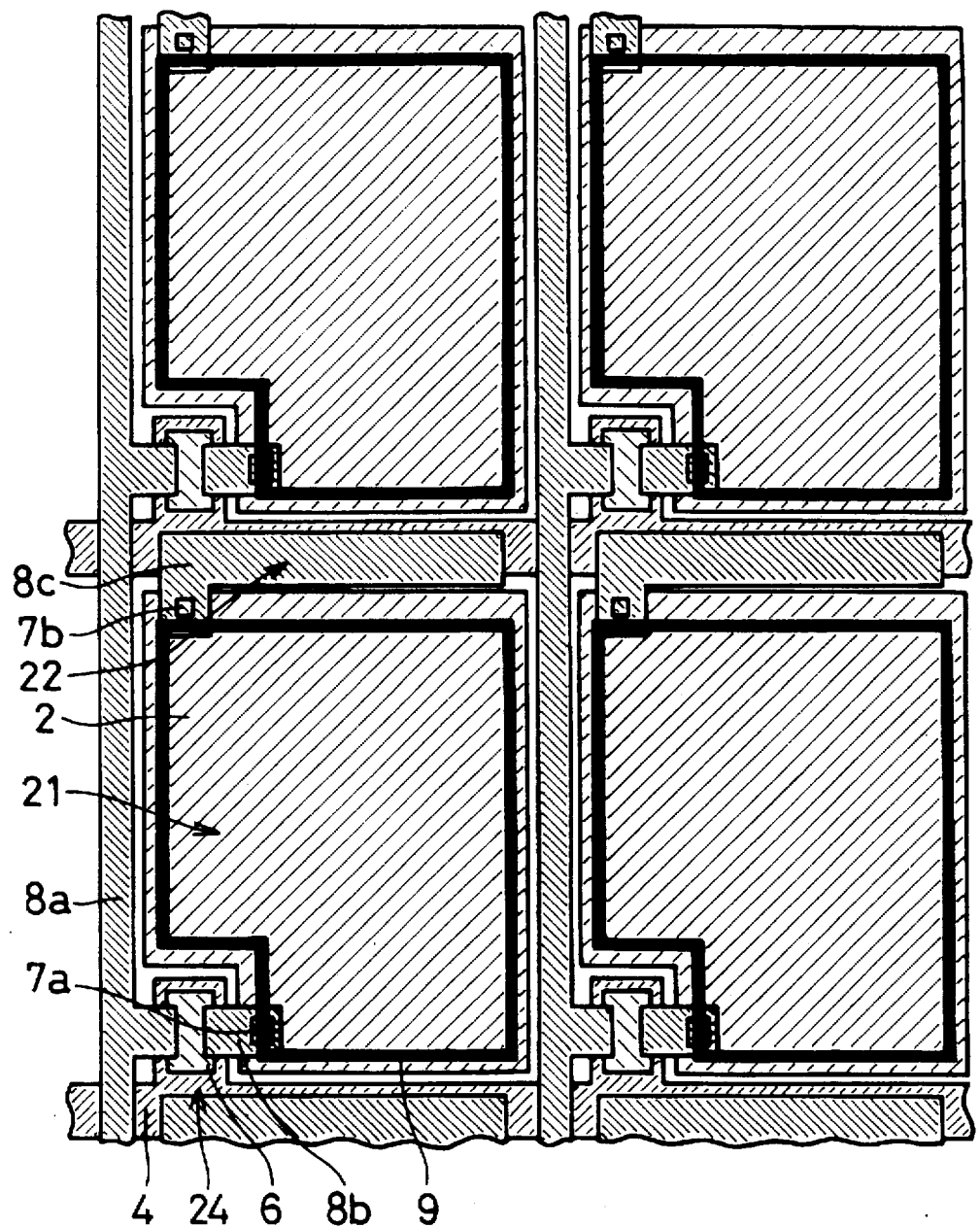
FIG. 10 is a plan view of a conventional TFT liquid crystal display unit.
Figure 11A:
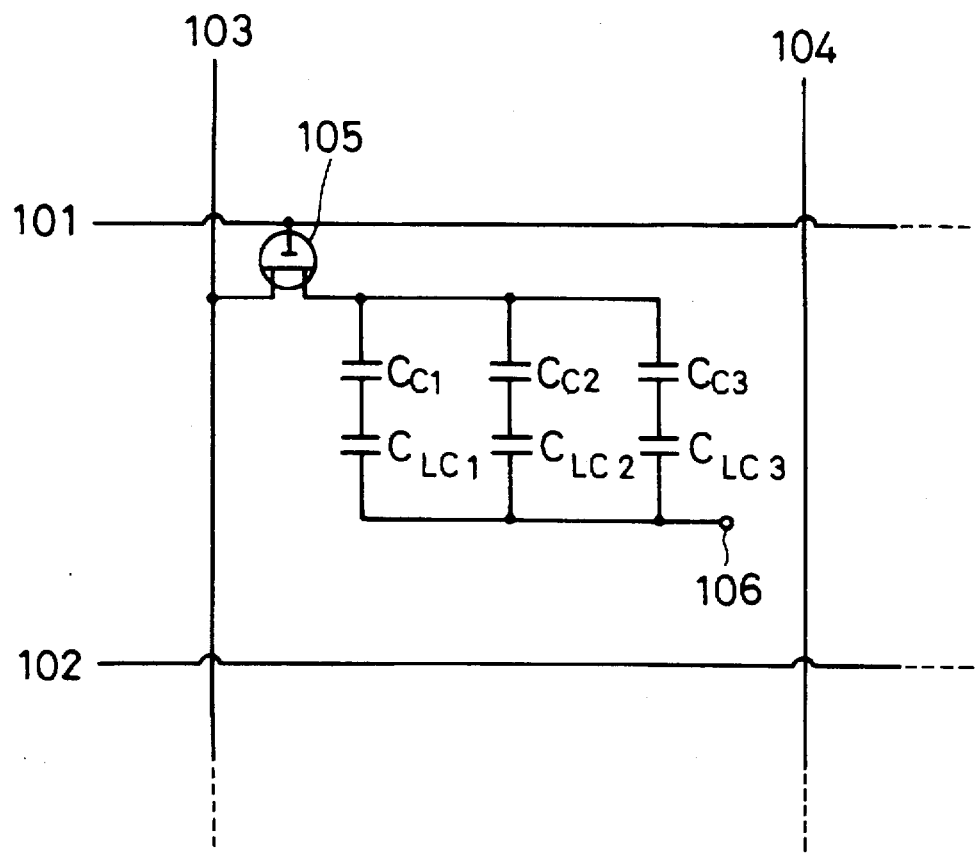
FIG. 11(a) is an equivalent circuit diagram of the liquid crystal display unit of a first conventional example.
Figure 11B:
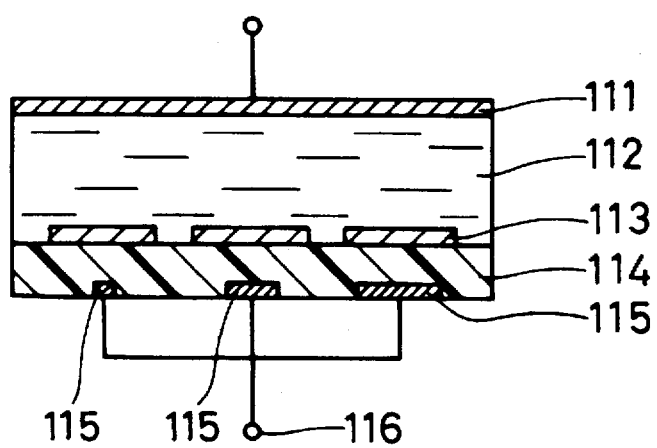
FIG. 11(b) is a cross-sectional view of the liquid crystal display unit of the first conventional example.
Figure 12:
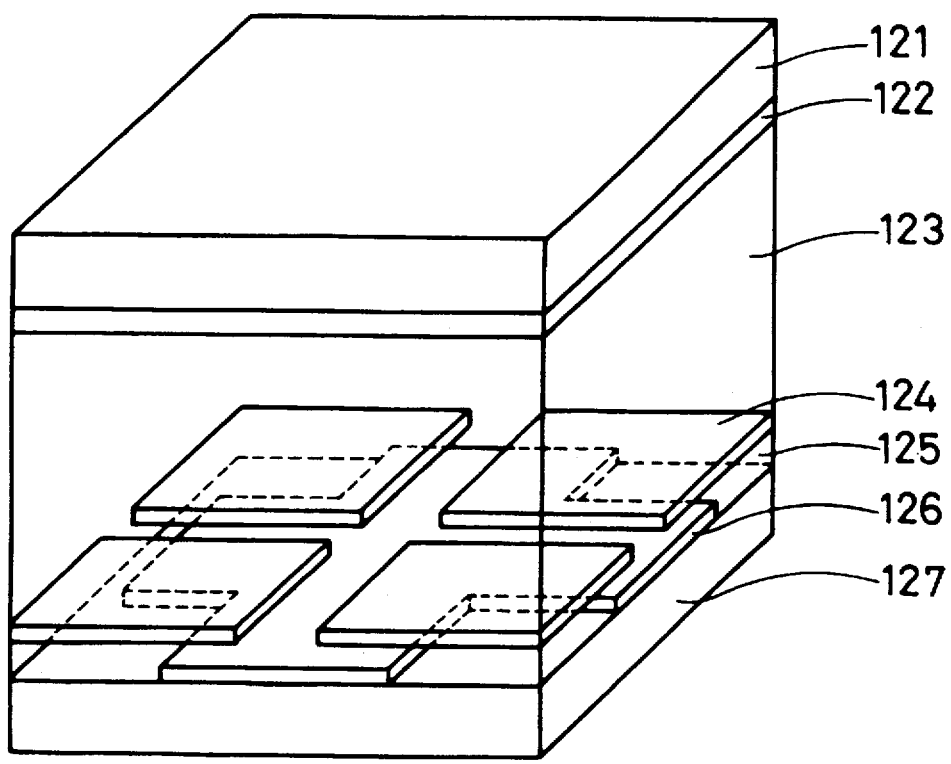
FIG. 12 is a perspective view of the liquid crystal display unit of a second conventional example.

FIG. 10 is a plan view of a conventional TFT liquid crystal display unit in which pixels are not subdivided. No conductive material and insulating film are added to the liquid crystal display unit shown in FIG. 10 when manufacturing the display unit shown in FIG. 1(a). Since the control capacitor is formed at the same time as the source and the drain electrodes, the display unit of the first embodiment can be manufactured by the conventional manufacturing method. Thus, a liquid crystal display unit having superior gradation display over a wide viewing angle can be provided for only the same cost required for manufacturing the conventional display unit.

Figure 13:
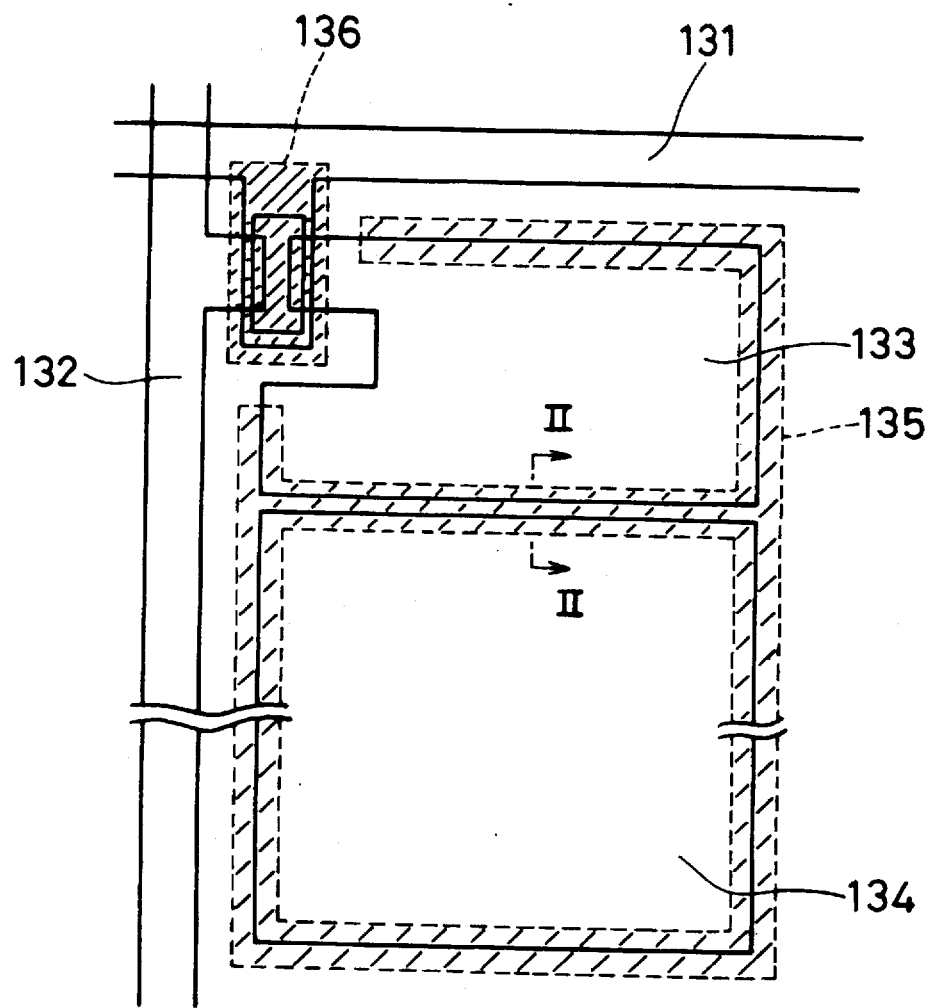
FIG. 13 is a plan view of the liquid crystal display unit of the third conventional example.

Referring to FIG. 1(b), control capacitor electrode 8c is electrically connected to drain electrode 8b, thus reducing the area occupied by the electrodes constituting the control capacitor compared with the area required for the electrodes of the conventional display unit (third conventional example) shown in FIG. 13. In this conventional display unit, the control capacitor consists of two capacitors coupled in series—a first subpixel electrode 133/control capacitor electrode 135 and a control capacitor electrode 135/second subpixel electrode 134. When the capacitance of the two capacitors is the same, each capacitor has to be twice as large as the capacitor applied to the display unit of the first embodiment in order to obtain the same capacitance that obtained in the unit of the first embodiment. In addition, the area occupied by the control capacitor is four times more than the area required for the capacitor in the display unit of the first embodiment since the capacitor in the conventional display unit employs two electrostatic capacitors. In the conventional display unit, the step of forming a hole in the insulating film so as to couple first subpixel electrode/drain electrode 133 to the control capacitor electrode is required, but is not needed in manufacturing the display unit of the first embodiment. Since the control capacitor electrode of the conventional display unit is made of a transparent conductive material, the transmissivity of light lowers, thus reducing the brightness of the display unit viewed from the front. More specifically, when color 10.4—type 640 (one pixel with three colors—R, G and B)×480 pixels are used for a conventional liquid crystal display unit, the numerical aperture (ratio between the area of transmitted light per pixel and the entire area of the pixel) is about 50%. On the other hand, the area occupied with the control capacitor is about 10% of the entire pixel area and the numerical aperture is 40%, when the above-mentioned pixels are applied to the display unit of the third conventional embodiment. In other words, the brightness of the display unit (third conventional example) from the front is less than the first conventional display unit (FIG. 10) by about 20%. However, in the display unit of the first embodiment of the present invention, the area occupied with the control capacitor is about 30% of the entire pixel area, and the numerical aperture is about 47%. Thus, the brightness from the front is lower than that of the first conventional display unit mentioned above only by about 6%, an extremely small reduction.

Figure 5:
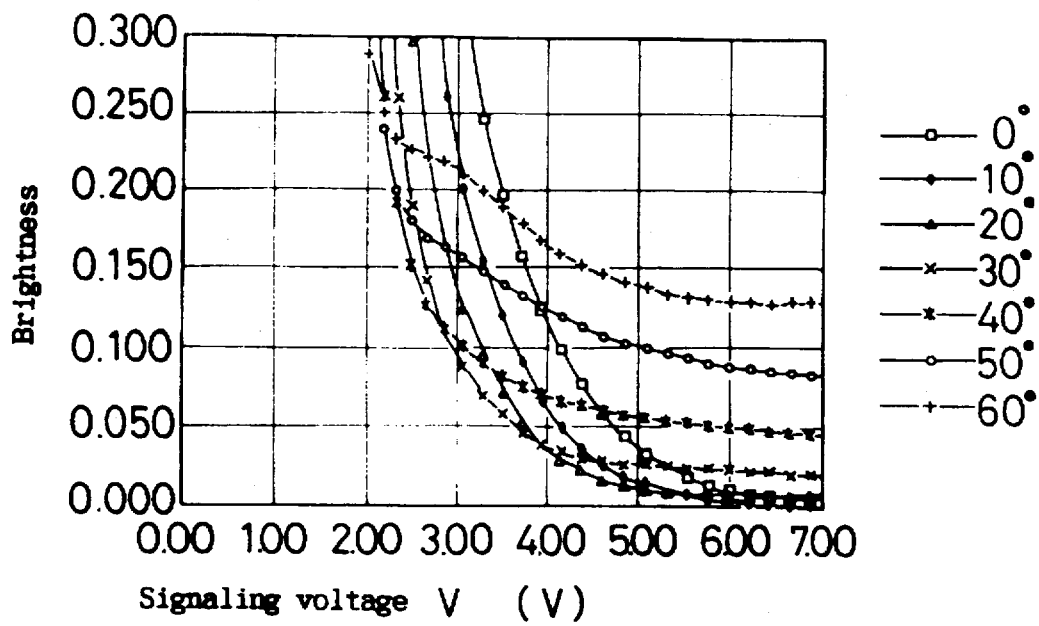
FIG. 5(a) is a graph showing the correlation between brightness and signaling voltage of the liquid crystal display unit of the first embodiment of the present invention when a viewpoint is inclined to the direction of a main viewing angle by 0°–60°.
FIG. 5(b) is a graph showing the correlation between brightness and signaling voltage of a liquid crystal display unit of a conventional example when a viewpoint is inclined to the direction of a main viewing angle by 0°–60°.
Figure 5:
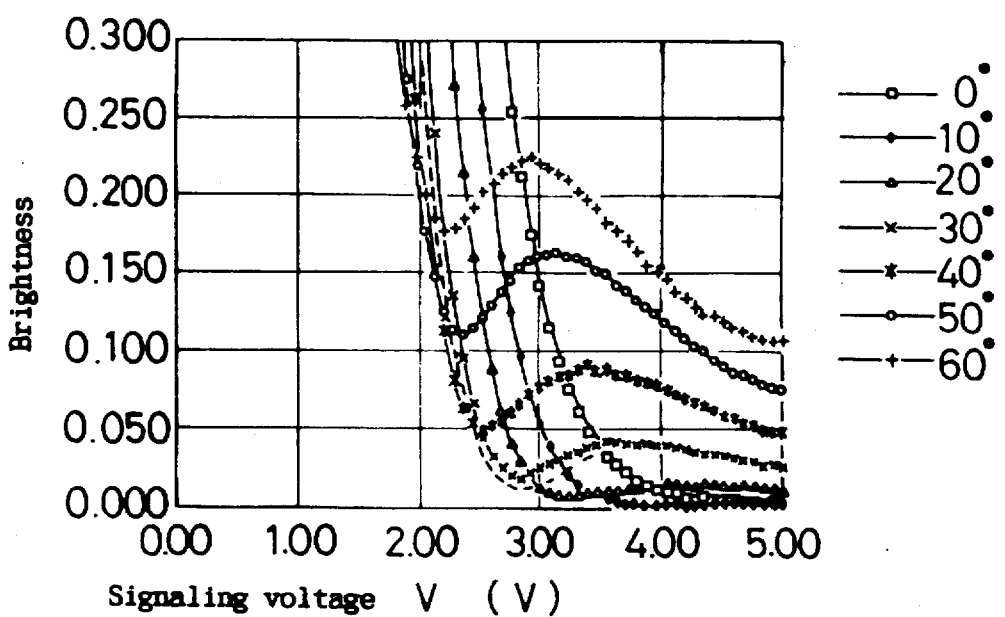
Figure 14:
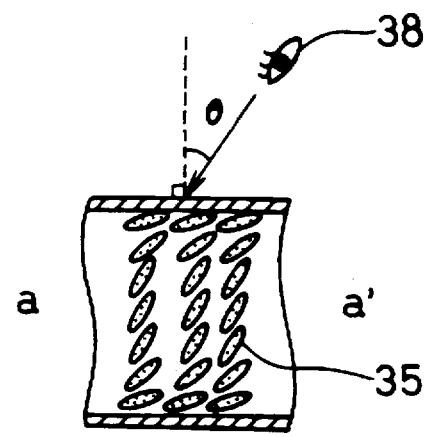
FIG. 14(a) illustrates a viewpoint when the viewing angle properties of the liquid crystal display unit of the present invention are measured.
FIG. 14(b) is a plan view of two transparent substrates, illustrating the directions of orienting the substrates of the present invention.
Figure 14:
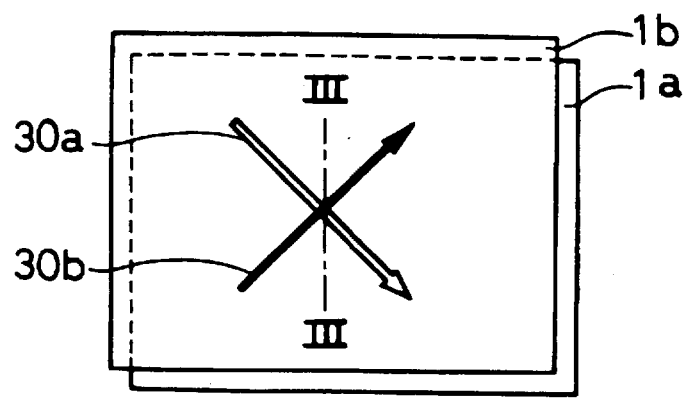

FIG. 5(b) is a graph illustrating the correlation between brightness and signaling voltage observed from a main viewing angle. The main viewing angle is defined as the direction of a viewpoint 38 shifted to the right as shown in FIG. 14(a), which is a cross-sectional view taken on line a–a' of FIG. 14(b). Referring to FIG. 14(b), the liquid crystal is sandwiched between two transparent glass substrates 1a and 1b, and bottom substrate 1a and top substrate 1b are oriented in directions 30a and 30b respectively. In FIG. 14(a), the liquid crystal molecules 35 are upright because of voltage applied to the section between the two substrates. In addition, the viewing angle (θ) is defined as an angle inclined from an axis perpendicular to the substrates. Referring to FIG. 5(b), in a conventional liquid crystal display unit, the gradation display becomes poor as a viewpoint is shifted to the main viewing angle. This is because the additional peaks of brightness appear on a high voltage side (called gradation reversal). In gradation reversal, the brightness at a white scale gradation and at a black scale gradation reverses, presenting a seemingly negative picture image.

Figure 3:
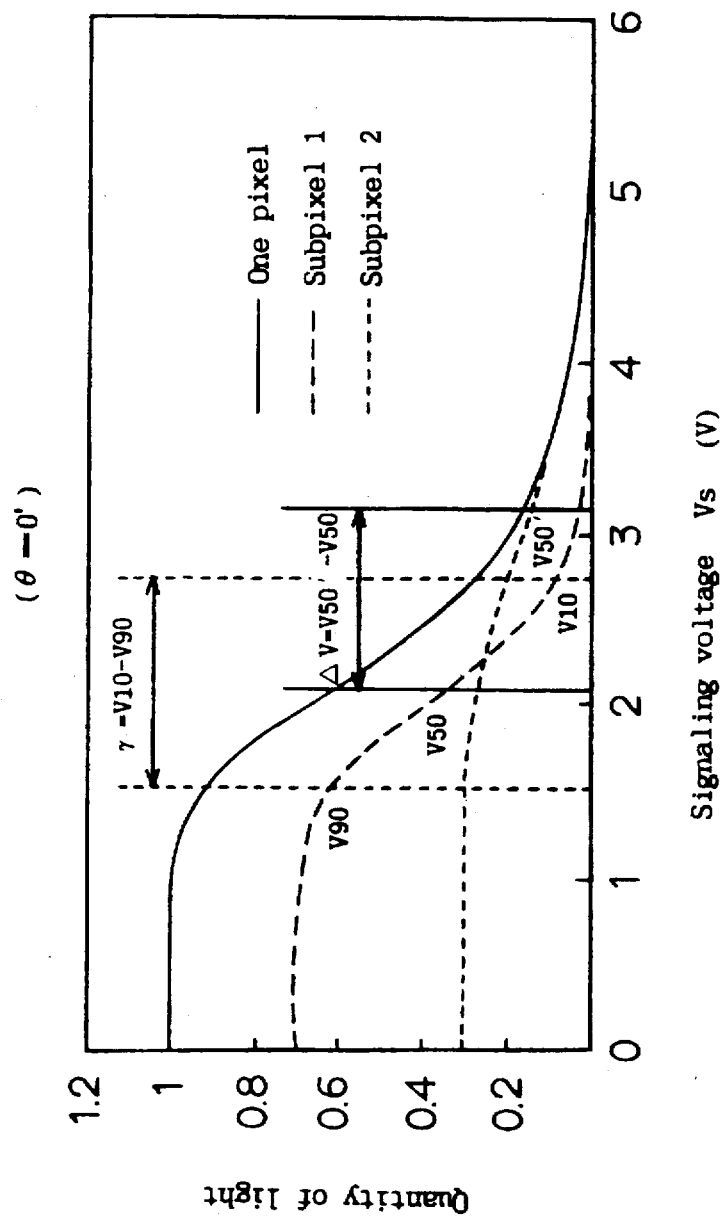
FIG. 3 is a graph showing the correlation between the quantity of light and signaling voltage of a pixel of the first embodiment of the present invention when the pixel is observed from the front.

FIG. 3 is a graph illustrating the correlation between the quantity of light and signaling voltage of a pixel when the liquid crystal display unit of the first embodiment is observed from the front. Control capacitor Cc is controlled to set Cc:Clc2 (V50) equal to 9:5. The capacitance of liquid crystal capacitor Clc2 changes depending on voltage applied to the capacitor and the direction of orienting the liquid crystal molecules. Clc2 (V50) is the capacitance when the quantity of light from the subpixel is 50% of the maximum quantity of light. The maximum quantity of light is obtained when no voltage is applied. The liquid crystal molecules are arranged almost parallel to the substrates with the maximum quantity of light. Referring to FIG. 3, when the slope of a line indicating the correlation between the quantity of light and signaling voltage of subpixel 1 is γ and the difference in driving voltage between subpixel 1 and subpixel 2 is ΔV, the following formulas are obtained:

$$\gamma = |V10 - V90| = 1.3 V,$$

$$\Delta V = |V50' - V50| = 1.0 V,$$

thus $$\gamma - \Delta V = 0.3 V.$$

In the formulas, V90, V50 and V10 are signaling voltages when the quantities of light of subpixel 1 are 90%, 50% and 10% of the maximum quantity of light, respectively. Similarly, V50' signaling voltage is obtained when the quantity of light of subpixel 2 is 50% of the maximum quantity of light.

Figure 4:
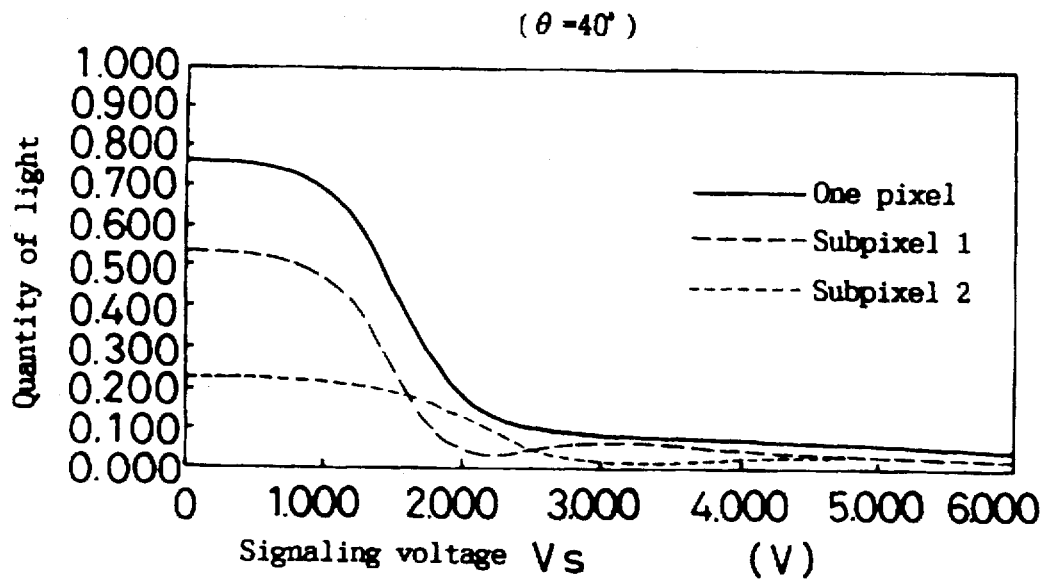
FIG. 4(a) is a graph showing the correlation between the quantity of light and signaling voltage of the pixel of the first embodiment of the present invention when a viewpoint is inclined to the direction of a main viewing angle by 40°.
FIG. 4(b) is a graph showing the correlation of FIG. 4(a), but on a smaller scale with regard to quantity of light.
Figure 4:
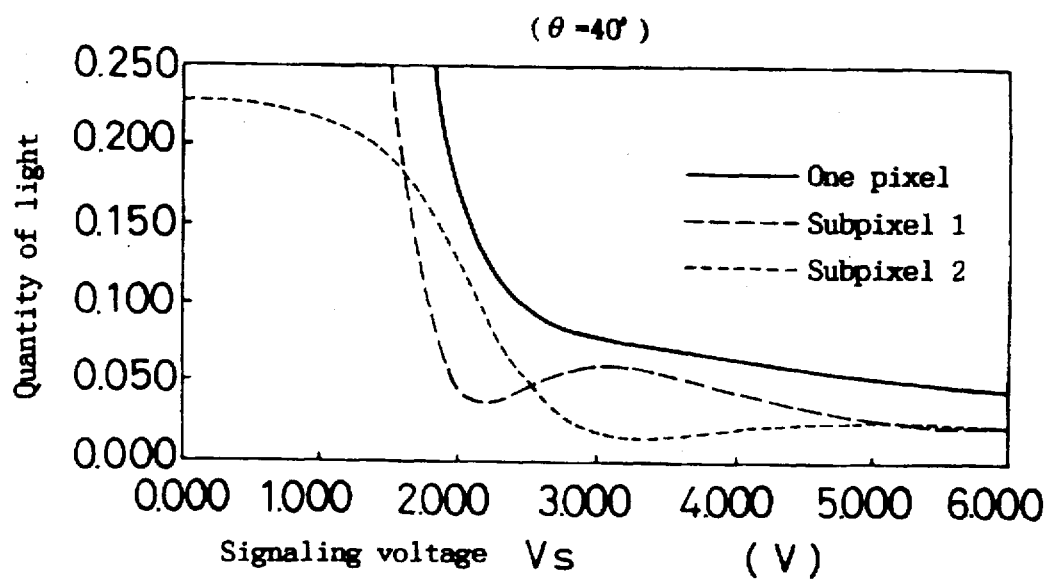

The ratio between display area 26a of subpixel 1 and display area 26b of subpixel 2 shown in FIG. 1(a) is 7:3. Thus, as shown in FIGS. 4(a) and (b), curves indicating the quantity of light and signaling voltage properties of a pixel, which is the combination of the properties of subpixels 1 and 2, are smooth. Moreover, the quantity of light decreases smoothly as signaling voltage increases. The gradation reversal of the conventional display unit shown in FIG. 5(b) is removed at any viewing angle when the display unit of the first embodiment is applied. (See FIG. 5(a).)

When γ–ΔV is more than –0.2V and less than 0.8V and the ratio between the display area of subpixel 1 and that of subpixel 2 is within the range of 8:2 to 6:2, a curve indicating the quantity of light and signaling voltage properties of a pixel is smooth. In addition, the quantity of light decreases smoothly as signaling voltage increases.

Therefore, by controlling the ratio of display area and the difference in driving voltage between subpixels, the gradation reversal observed from the main viewing angle is removed and good multiple gradation display properties are obtained even in a liquid crystal display unit having only two subpixels for each pixel.

Figure 6A:
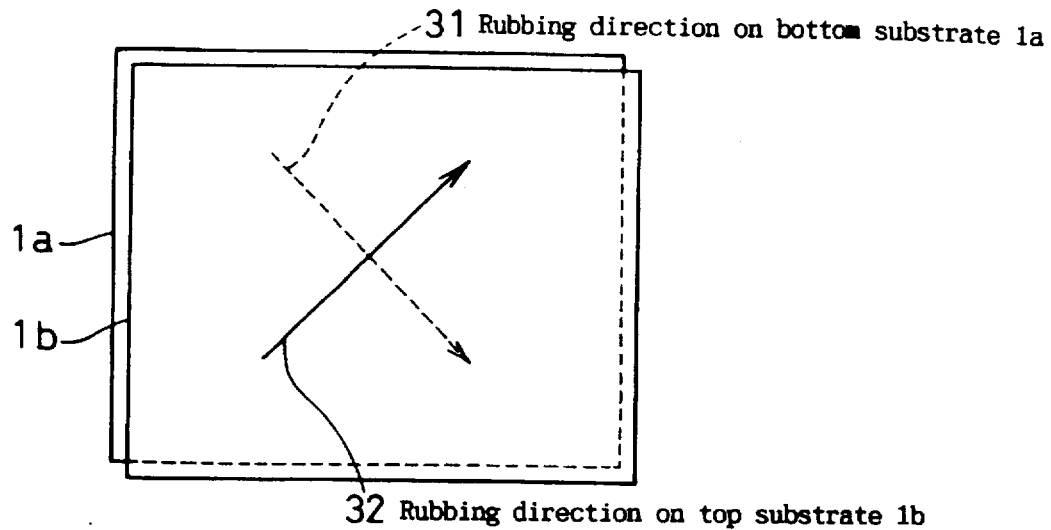
FIG. 6(a) illustrates rubbing directions on two transparent substrates of the liquid crystal display unit of the first embodiment of the present invention.
Figure 6B:
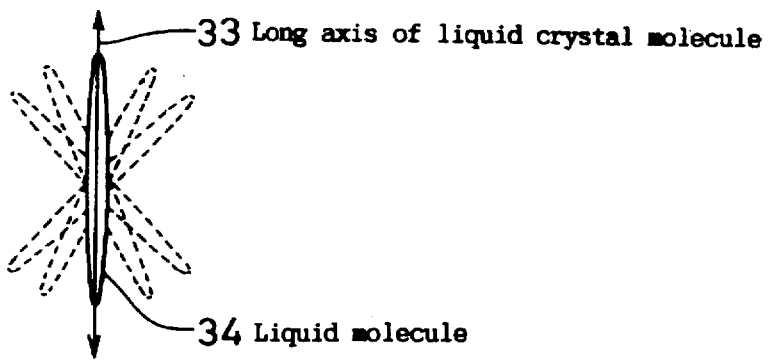
FIG. 6(b) illustrates the orientation of a liquid crystal molecule influenced by the rubbing directions shown in FIG. 6(a).
Figures 6C, 6D:
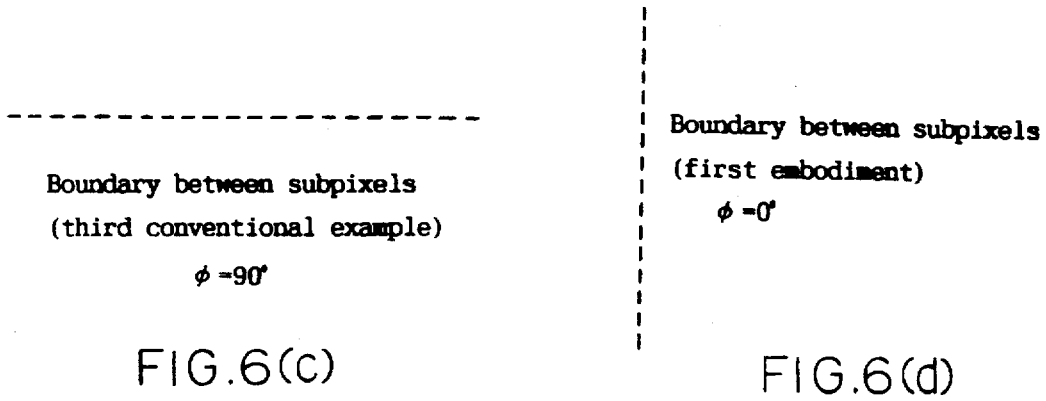
FIG. 6(c) illustrates a boundary between the subpixels of the liquid crystal display unit of a third conventional example.
FIG. 6(d) illustrates a boundary between the subpixels of the liquid crystal display unit of the first embodiment of the present invention.
Figure 9:
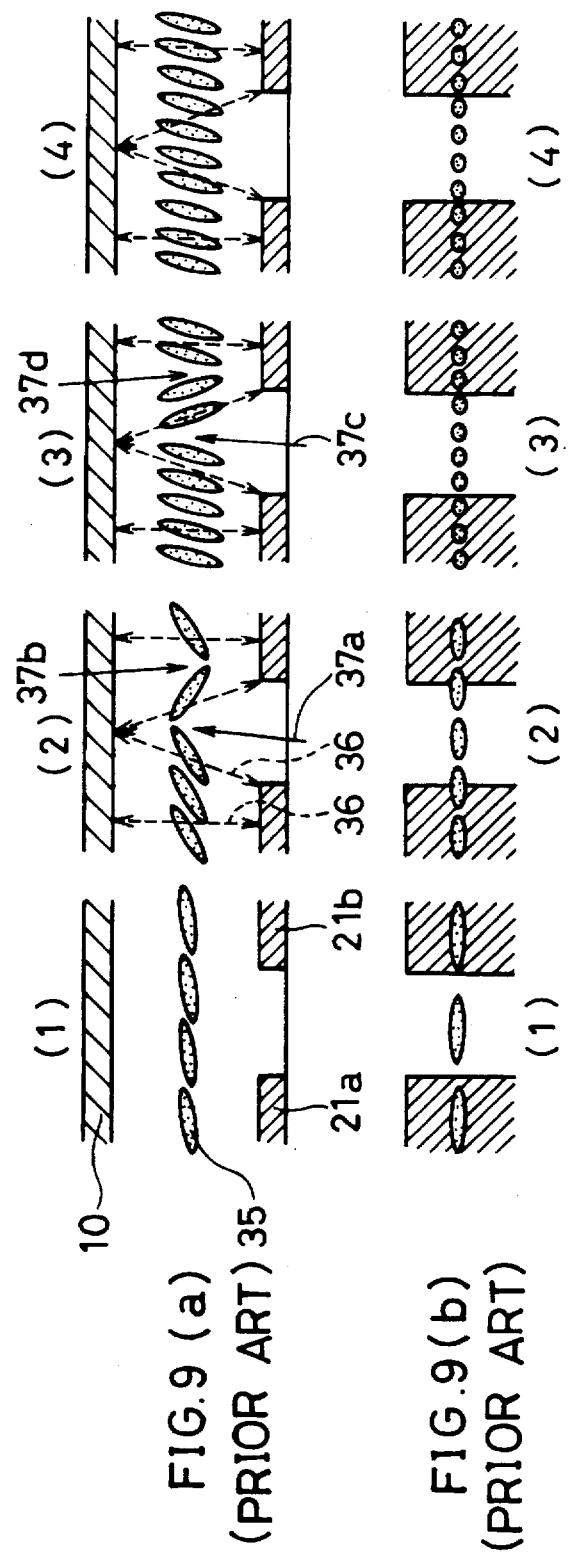
FIG. 9(a) is a cross-sectional view taken on line c–c' of FIG. 13, illustrating the movement of liquid crystal molecules in the middle layer of the liquid crystal between subpixels when the liquid crystal display unit of the conventional example shifts from white to black scale gradations.
FIG. 9(b) is a plan view taken on line c–c' of FIG. 13, illustrating the movement of liquid crystal molecules in the middle layer of the liquid crystal between subpixels when the liquid crystal display unit of the conventional example shifts from white to black scale gradations.

FIG. 6(a) illustrates rubbing directions 31 on the bottom substrates 1a of the liquid crystal display unit of the first embodiment. FIG. 6(a) illustrates rubbing directions 32 on the top substrates 1b of the liquid crystal display unit of the first embodiment. FIG. 6(b) illustrates the long axis direction 33 of the liquid crystal molecule 34 in the middle layer of the liquid crystal layer. FIG. 6(c) illustrates a boundary between subpixels in the conventional liquid crystal display unit (third conventional example). FIG. 6(d) illustrates a boundary between subpixels in the liquid crystal display unit of the first embodiment. FIG. 9 (a) is a cross-sectional view taken on line c–c' of FIG. 13; FIG. 9 (b) is a plan view taken on line c–c' of FIG. 13. FIGS. 9(a) and (b) also illustrate the movement of liquid crystal molecules when display is shifted from the white scale to the black scale. Referring to FIG. 9(a), (1) shows the liquid crystal molecules 35 in a steady state at the white scale; (4) illustrates the molecules in a steady state at the black scale; (2) and (3) show the molecules in transitional states from the white to the black scales. At the white scale (1), the liquid crystal molecules 35 are oriented with an angle of several degrees relative to the substrates (tilt). When applied voltage is switched to the black scale, the molecules stand with larger tilts due to an electric field perpendicular to the substrates and between the common electrode 10 and each of subpixel electrodes 21a and 21b. However, at the boundary between subpixel electrodes, the directions of electric field incline (indicated as slightly inclined dotted lines in (2)), thus influencing the orientation of liquid crystal molecules above the boundary. In this example, the long axes of liquid crystal molecules are almost parallel to the directions of the electric field at the boundary, so that the molecules are likely to be influenced by the direction of electric field. As a result, as shown in (2) and (3), some liquid crystal molecules are oriented differently from other molecules and along the direction of electric field. The leakage of light 37a–37d are generated at the boundary between liquid crystal molecules with different orientations (domain). As shown in (4), the orientation of some liquid crystal molecules becomes normal at the end due to the effect of other molecules which are already oriented regularly. However, compared with a display unit in which pixels are not subdivided, this conventional display unit requires much time to shift from the white scale to the black scale. As a result, an after-image appears on the displayed image. This problem can be solved when the boundary between subpixels is shielded with opaque patterns as shown in FIG. 13. However, due to the opaque patterns, the numerical aperture of pixels decline, and the brightness of display decreases.

Figure 8:
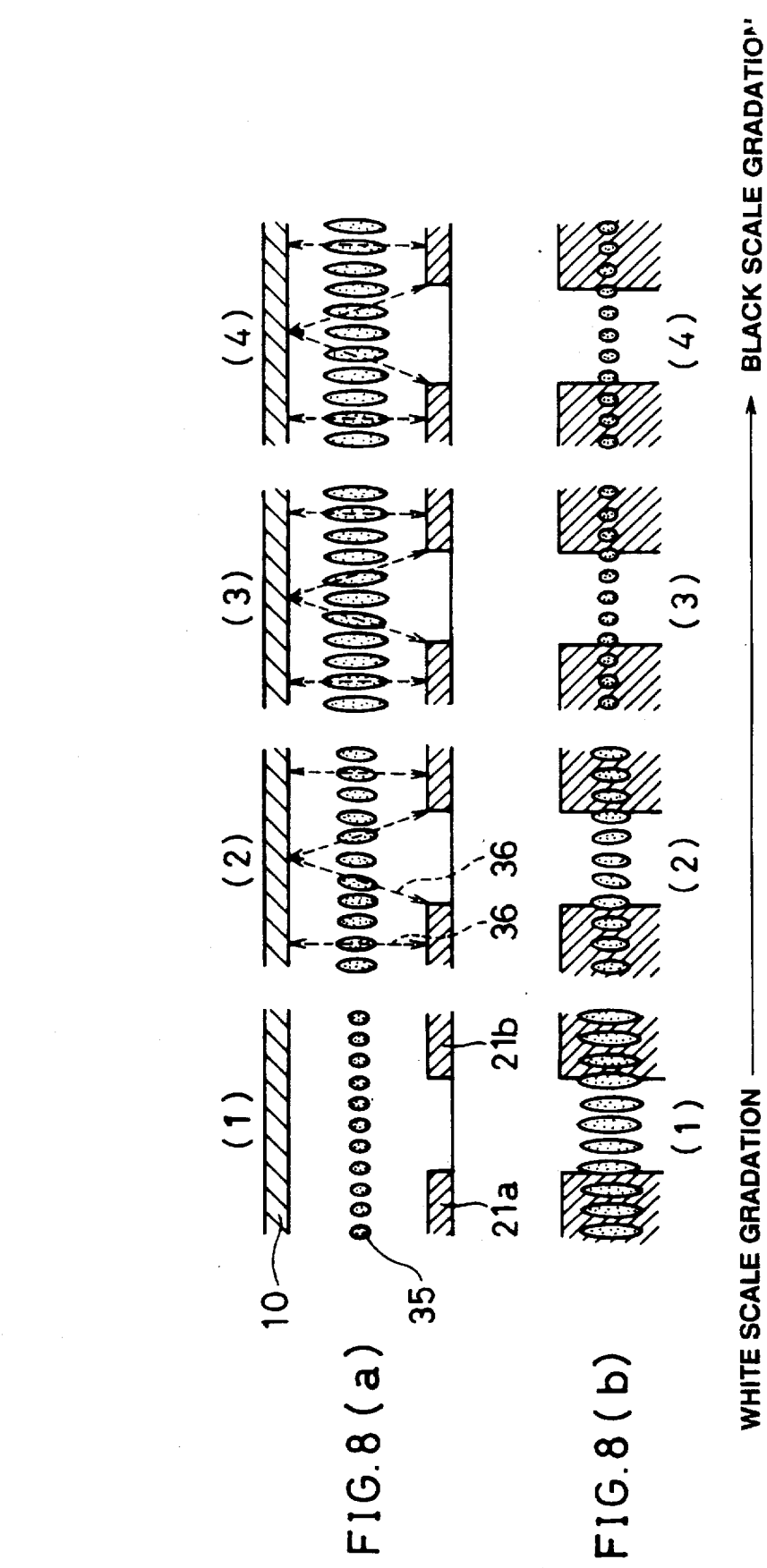
FIG. 8(a) is a cross-sectional view taken on line b–b' of FIG. 1(a), illustrating the movement of liquid crystal molecules in the middle layer of the liquid crystal between subpixels when the liquid crystal display unit of the first embodiment of the present invention shifts from white to black scale gradations.
FIG. 8(b) is a plan view taken on line b–b' of FIG. 1(a), illustrating the movement of liquid crystal molecules in the middle layer of the liquid crystal between subpixels when the liquid crystal display unit of the first embodiment of the present invention shifts from white to black scale gradations.

FIG. 8(a) is a cross-sectional view taken on line b–b' of FIG. 1(a); FIG. 8(b) is a plan view taken on line b–b' of FIG. 1 (a). The figures illustrate the movements of liquid crystal molecules 35 in the middle layer of the liquid crystal layer when the white scale is shifted to the black scale. 10 is a common electrode. At the boundary between the subpixel electrodes 21a, 22b, the directions of the electric field 36 incline (indicated as slightly inclined dotted lines in (2)), so that the orientation of liquid crystal molecules above the boundary is influenced. However, in this example, the long axes of liquid crystal molecules are perpendicular to the directions of the electric field, so that the molecules are rarely affected by the electric field. Therefore, the movement of molecules above the boundary is the same as that of the molecules above the electrodes, and no irregular orientation mentioned above is found in this example. In other words, it is not necessary to form a shielding pattern at the boundary of subpixels; thus, the numerical aperture of the pixel and the brightness of the display screen are maintained.

Referring to FIG. 1(b), the gap between the subpixel electrodes (w) is twice as thick as the liquid crystal layer (d) or less. Voltage applied to the liquid layer of subpixel 2 is a divided voltage, which is applied to subpixel 1 as shown in FIG. 1 (c), and the subpixels have the same polarity. About 60% of signaling voltage is applied to subpixel 2. When the saturation voltage of the liquid crystal is 6V and signaling voltage is 10V, voltage applied to subpixel 1 is 10V and that to subpixel 2 is 6V so as to obtain a preferable black scale. The potential difference between subpixel electrode 1 and subpixel electrode 2 is 4V at maximum, and is much smaller than voltage generated between subpixel electrode 1 and source electrode 8a, and between subpixel electrode 2 and source electrode 8a. The potential difference is also slightly smaller than the voltage applied between subpixel electrode 2 and common electrode 10. In other words, the generation of an electric field between the subpixels is weak.

Figure 7:
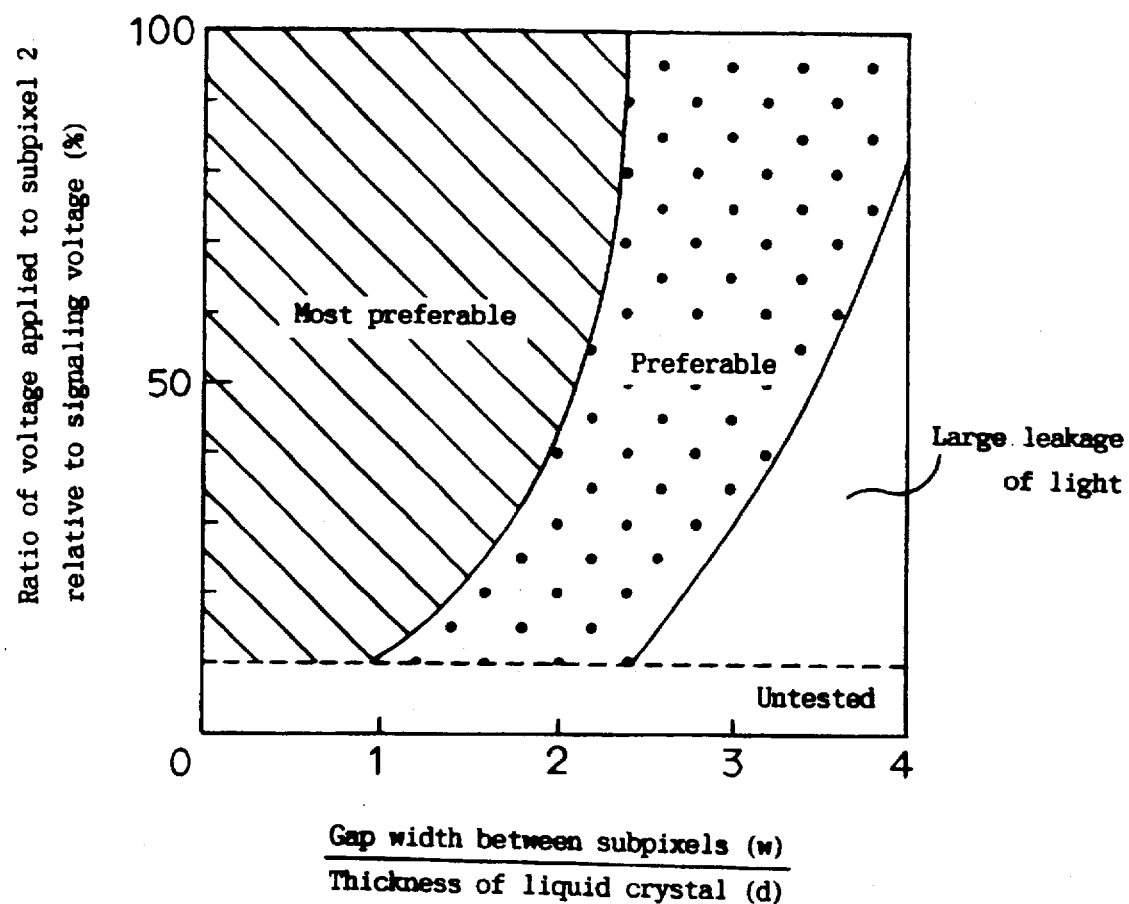
FIG. 7 is a graph illustrating the properties of light leakage between the subpixels of liquid crystal display unit of the first embodiment of the present invention.

By changing the width of the gap between subpixel electrode 1 and subpixel electrode 2 (w) and the ratio of voltage applied to subpixel 2 relative to signaling voltage, the leakage of light from the gap and from the peripheral section of the subpixels was tested, thus obtaining the graph shown in FIG. 7. The gap width (w) is normalized by the thickness of liquid crystal layer (d). The capacitance of the liquid crystal changes, depending on applied voltage. The ratio of voltage mentioned above is obtained by applying the capacitance when signaling voltage is high and the liquid crystal is activated. When the ratio is in the range of 10% or less, signaling voltage required to operate subpixel 2 becomes too high, so that tests were not carried out in that range. Referring to FIG. 7, it is found that light is less likely to leak as the gap width (w) becomes small relative to the thickness of liquid crystal layer (d) and the ratio of voltage becomes large.

There are two reasons why it is preferable to have a narrower gap between the subpixel electrodes. First, the liquid crystal molecules above the gap move along with the discharge of electric field and the movement of liquid crystal molecules above the subpixels. When signaling voltage is high, the liquid crystal molecules above the gap and near the subpixels move due to the first reason mentioned above, thus reducing brightness. However, when the gap width is small, all the liquid crystal molecules above the gap respond to signaling voltage, thus providing superior black scale gradation. Secondly, the irregular orientation of liquid crystal molecules is unlikely to occur when the gap is small, thus preventing the scatter and leakage of light. When the gap is small, it is believed that the spread of electric field is restricted even though the intensity of the field increases, thus reducing the negative effect on liquid crystal molecules above the gap. The reason why leakage of light is unlikely to occur when the ratio of voltage applied to subpixel 2 relative to signaling voltage is high is that the potential difference between the subpixel electrodes becomes small.

Referring to FIG. 7, leakage of light due to the irregular orientation of liquid crystal molecules or the like is not a problem in the region identified as "most preferable", and the black scale gradation is in extremely good condition since the liquid crystal molecules above the gap move according to signaling voltage. Thus, a layer to shield the gap is not required. In the region identified as "preferable" shown in FIG. 7, the gap does not become completely black under ordinary driving conditions and signaling voltage. However, leaked light due to irregular orientation or the like does not enter the subpixels, so that the display is practical enough even without the shielding layer, as long as extremely high contrast is not required. In the region identified as "large leakage of light", leaked light enters the subpixels, so that display becomes poor with no shielding layer.

When the gap width between the subpixels is set to be two times as large as the thickness of the liquid crystal layer or less, the display properties of the display unit are "most preferable" or "preferable" with any ratio of voltage applied to subpixel 2 relative to signaling voltage. Even though it is preferable to set the voltage ratio at 40–80%, "most preferable" display properties are likely to be obtained at almost any voltage ratio as long as the gap width is two times as thick as the liquid crystal layer or less. Taking manufacturing cost into consideration, the gap width between the subpixels is preferably 1.5 times as thick as the liquid crystal layer or less.

In consideration of processing cost and the leakage of light, a several to 10 μm-thick shielding layer should be laminated on each subpixel and the gap between the subpixels. Thus, the thickness of the shielding layer becomes 20–30 μm. With no formation of the layer, light transmitted through the gap is utilized at the white scale gradation, so that the brightness of the liquid crystal unit improves. In a 640×400 dot liquid crystal display unit with a 26 cm diagonal line, the pixel pitch is about 300 μm. However, by applying the display unit of the present invention, the brightness at the white scale gradation increases by about 10%.

EXAMPLE 2

Figure 2:
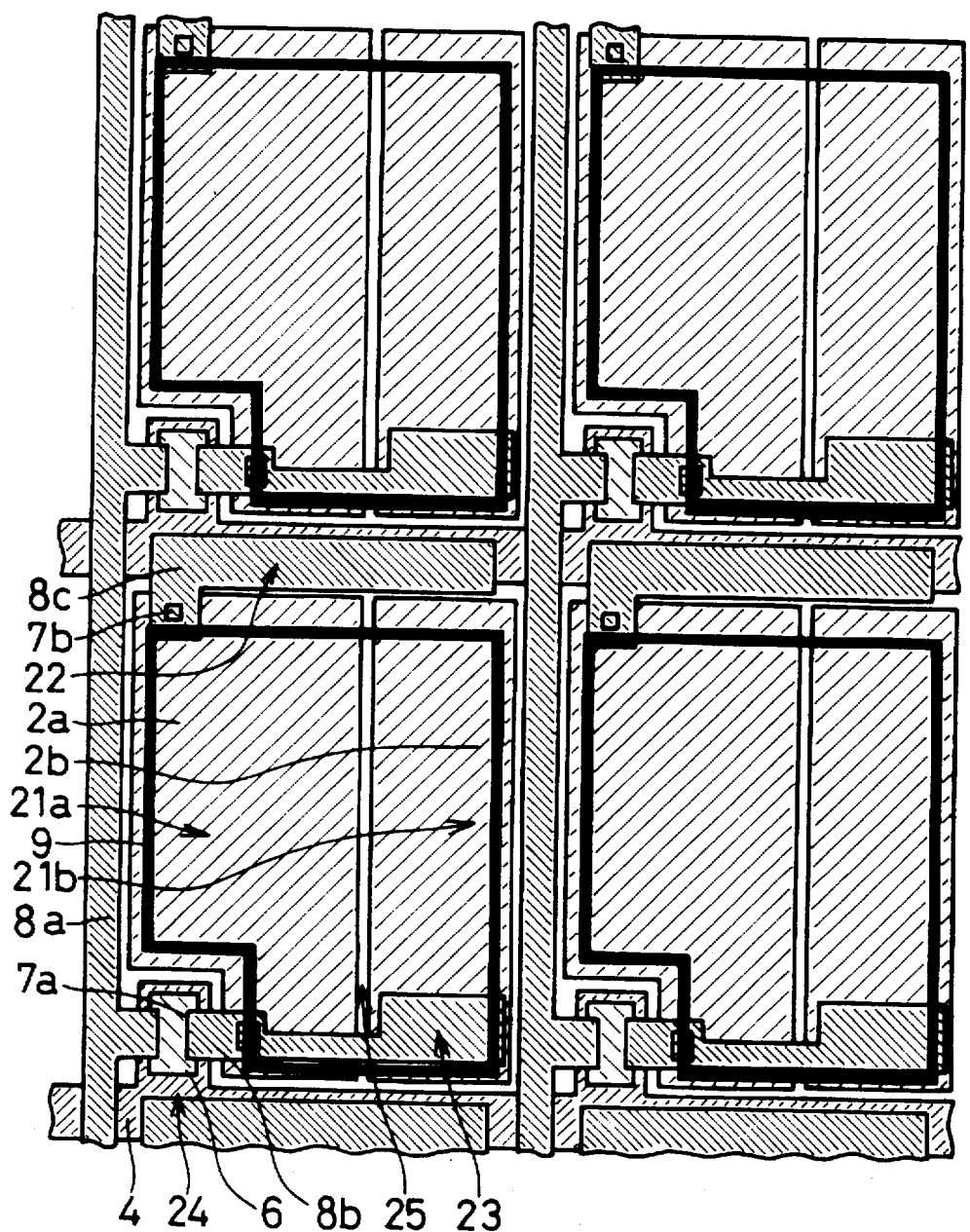
FIG. 2 is a plan view of a liquid crystal display unit having a TFT of a second embodiment of the present invention.

The second embodiment of the present invention is explained by referring to FIG. 2. In this example, a control capacitor electrode is made of a pattern 8b coupled to a drain electrode constituting a thin-film transistor. Other structures and effects of the display unit are the same as the ones of the display unit of the first embodiment of the present invention.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A liquid crystal display unit comprising:

two insulating substrates;

a liquid crystal layer sandwiched between said two insulating substrates;

a plurality of pixels arranged in a matrix;

at least two subpixels in each pixel; and means for applying voltage to a liquid crystal layer of each subpixel; wherein voltage applied to a liquid crystal layer of one subpixel is different from voltage applied to a liquid crystal layer of another subpixel; and wherein a ratio of display area between said subpixels and a difference in driving voltage of said subpixels are controlled so that the correlation between quantity of light and signaling voltage is monotonously falling or monotonously rising; said pixel being observed at an angle of 0°–40° inclined from an axis perpendicular to said insulating substrates along a long axis of liquid crystal molecules positioned in a middle layer of said liquid crystal layer with no application of voltage.

2. The liquid crystal display unit of claim 1, wherein the pixel comprises two subpixels.

3. The liquid crystal display unit of claim 2, wherein the two subpixels have different driving voltages; wherein a difference in driving voltages ($\Delta V$) being expressed as follows:

$$-0.2V < -\Delta V < 0.8V;$$

$$\gamma = |V10 - V90|;$$

and $$\Delta V = |V50' - V50|;$$

where V10, V50 and V90 are signaling voltages so as to set quantities of light for one subpixel, which is driven applying high voltage, at 90%, 50% and 10% relative to a maximum quantity of light, and V50' is a signaling voltage so as to set a quantity of light of another subpixel, which is driven applying low voltage, at 50% relative to a maximum quantity of light.

4. The liquid crystal display unit of claim 3, wherein the two subpixels have from 8:2 to 6:4 ratios of display areas; said ratios of display areas being ratios of a display area of one of said subpixels relative to a display area of another subpixel.

5. A liquid crystal display unit comprising:

two insulating substrates;

a liquid crystal layer sandwiched between said two insulating substrates;

a polarizing plate on an exterior surface of each insulating substrate so as to set a polarizing axis of one polarizing plate at right angles to a polarizing axis of another polarizing plate;

a plurality of pixels arranged in a matrix;

at least two subpixels in each pixel; and means for controlling voltage applied to each subpixel;

wherein voltage applied to one subpixel is different from voltage applied to another subpixel; and wherein $0° \leq \phi \leq 450°$ where (is an angle between a long axis of liquid crystal molecules when viewed from a direction perpendicular to said two insulating substrates and a boundary between said subpixels with no application of voltage.

6. The liquid crystal display unit of claim 5, further comprising a thin-film transistor and a control capacitor on one of the insulating substrates.

* * * * *